(12) United States Patent
Lu et al.

(10) Patent No.: US 9,437,196 B2
(45) Date of Patent: Sep. 6, 2016

(54) WORKING METHOD OF SOUND TRANSMISSION-BASED DYNAMIC TOKEN

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 19 days.

(21) Appl. No.: 14/383,593

(22) PCT Filed: Aug. 30, 2013

(86) PCT No.: PCT/CN2013/082705
§ 371 (c)(1),
(2) Date: Sep. 8, 2014

(87) PCT Pub. No.: WO2014/036912
PCT Pub. Date: Mar. 13, 2014

(65) Prior Publication Data
US 2015/0228284 A1    Aug. 13, 2015

(30) Foreign Application Priority Data

Sep. 4, 2012  (CN) .......................... 2012 1 0323606

(51) Int. Cl.
*G10L 17/24* (2013.01)
*H04L 9/32* (2006.01)
*H04K 1/00* (2006.01)

(52) U.S. Cl.
CPC ................. *G10L 17/24* (2013.01); *H04K 1/00* (2013.01); *H04L 9/3228* (2013.01); *H04L 9/3231* (2013.01)

(58) Field of Classification Search
CPC .......................... H04L 9/3228; H04L 9/3231
See application file for complete search history.

(56) References Cited

U.S. PATENT DOCUMENTS

| | | | |
|---|---|---|---|
| 2006/0265340 A1* | 11/2006 | Ziv ....................... | G06Q 20/341 705/76 |
| 2007/0186105 A1* | 8/2007 | Bailey ................. | H04L 63/0492 713/168 |
| 2007/0234401 A1* | 10/2007 | Eldar ...................... | H04L 12/12 726/2 |
| 2011/0072499 A1* | 3/2011 | Lin .......................... | G06F 21/35 726/6 |
| 2011/0258704 A1* | 10/2011 | Ichnowski .............. | H04L 67/02 726/26 |
| 2012/0078639 A1 | 3/2012 | Kumar | |
| 2012/0154181 A1* | 6/2012 | Rhee ...................... | H03M 11/08 341/26 |
| 2015/0207790 A1* | 7/2015 | Lu .......................... | H04L 9/3228 726/9 |
| 2015/0304313 A1* | 10/2015 | Lu ......................... | H04L 9/3228 726/9 |

FOREIGN PATENT DOCUMENTS

CN         202309734       *  7/2012

OTHER PUBLICATIONS

Machine translation for CN202309734, by Li, Jul. 2012.*

* cited by examiner

*Primary Examiner* — Qian Yang
(74) *Attorney, Agent, or Firm* — Hammer & Associates, P.C.

(57) ABSTRACT

A working method of a sound transmission-based dynamic token comprises: a dynamic token waiting for disconnection of a key; and when the disconnection of the key is detected, judging the type of a pressed key, and performing a corresponding operation according to different types of keys.

24 Claims, 7 Drawing Sheets

US 9,437,196 B2

WORKING METHOD OF SOUND TRANSMISSION-BASED DYNAMIC TOKEN

TECHNICAL FIELD

The present invention relates to information security field, and particularly relates to a working method of a voice transfer based dynamic token.

PRIOR ART

OTP (One-time Password), nicknamed a dynamic password, is un-predictable random number combination generated by a dynamic token with special algorithm every specific time. Each OTP can be used only once. When a user is authenticated, besides inputting an account number and a static password, he/she must input OTP, and only if he/she passes authentication by a system, can he/she normally log on or transact so as to ensure legitimacy and uniqueness of identity of the user. A distinct advantage of the dynamic token is that password used each time by a user is different, which prevents valid user identity from being faked by a misfeasor. The OTP authentication technology is thought as one of efficient methods for authenticating identity of a user, it can avoid networking problems such as a hacker or Trojan stealing user account password or faked website and the problems result in loss in user asset or information. Currently, the dynamic token is widely used in fields such as E-banking, E-game, telecommunication operator, electronic government and enterprises.

Comparing with a traditional dynamic token, the dynamic token generating OTP with user information has a higher security. The dynamic token receives user information before generating a OTP. For the time being, the dynamic token generating OTP with user information has a keyboard itself, and the user information is input by a user through the keyboard built in the dynamic token.

During the invention, inventors found that, in case of inputting a plurality of user information, manual input has a low speed and a high error rate; and because error input is not easy to be found and modified, user's time is wasted and unnecessary trouble may come with.

SUMMARY OF THE INVENTION

The object of the present invention is to provide a working method of a voice transfer based dynamic token is provided by the invention, in which the dynamic token obtains data by receiving and parsing voice signals, and receives related user information sent by a terminal by contactless transfer, so as to reduce manual input and improve efficiency of information transfer.

Thus, according to one aspect of the present invention, there is provided a working method of a voice transfer based dynamic token, comprising:

Step a), waiting for receiving a button interruption and determining whether the button interruption is received, if yes, determining type of the pressed button, if the pressed button is a Power button, going to Step b); if the pressed button is a Collect button, going to Step c); if the pressed button is a Confirm button, going to Step a);

Step b), checking for current status of the dynamic token, if the current status is Sleep status, setting the current status into Standby status, displaying a Standby interface and going to Step f); if the current status is Standby status or status of collecting data or status of waiting for confirmation, setting the current status into Sleep status and going to Step a);

Step c), checking for current status of the dynamic token, if the current status is Standby status, setting the current status into status of collecting data, collecting and decoding voice data, and after the decoding is completed, setting the current status into status of waiting for confirmation, displaying received data and going to Step f);

Step d), checking for current status of the dynamic token, if the current status is Sleep status, going to Step a); if the current status is status of collecting data, returning to Step a); if the current status is status of waiting for confirmation, setting the current status into status of displaying a OTP, generating and displaying a OTP according to the received data; if the current status is status of displaying the OTP, returning to Step a);

Step f), waiting for a button interruption and determining whether the button interruption is detected, if the button interruption is detected, determining type of the pressed button, if the pressed button is a Power button, returning to Step b); if the pressed button is Collect button, returning to Step c); if the pressed button is Confirm button, returning to Step d); if the button interruption is not detected, going to Step g); and Step g), determining whether timeout happens, if yes, setting the current status into Sleep status and returning to Step a); if no, returning to Step f).

According to another aspect of the present invention, there is provided a working method of a voice transfer based dynamic token, comprising:

Step A), waiting for receiving a button interruption and determining whether the button interruption is received, if yes, determining type of the pressed button, if the pressed button is the first physical button, going to Step B); if the pressed button is the second physical button, going to Step E); otherwise, continuously executing the Step A);

Step B), determining whether any button has been pressed over a preset time, if yes, going to execute Step C), otherwise, going to execute Step D);

Step C), checking for current status of the dynamic token, if the current status is Sleep status, setting the current status into Standby status, displaying a Standby interface and going to Step F); if the current status is Standby status or status of collecting data or status of waiting for confirmation or status of displaying a OTP, setting the current status into Sleep status and going to Step A);

Step D), checking for current status of the dynamic token, if the current status is Standby status, setting the current status into status of collecting data, collecting and decoding voice data, and after the decoding is completed, setting the current status into status of waiting for confirmation, displaying received data and going to Step F);

Step E), checking for current status of the dynamic token, if the current status is Sleep status, going to Step A); if the current status is status of collecting data, returning to Step A); if the current status is status of waiting for confirmation, setting the current status into status of displaying a OTP, generating and displaying a OTP according to the received data; if the current status is status of displaying the OTP, returning to Step A);

Step F), waiting for a button interruption and determining whether the button interruption is detected, if the button interruption is detected, determining type of the pressed button, if the pressed button is the first physical button, returning to Step B); if the pressed button is the second physical button, returning to Step E); otherwise going to execute Step G); and Step G), determining whether timeout happens, if yes, setting the current status into Sleep status and returning to Step A); if no, returning to Step F).

Advantage of the invention comprises that the dynamic token obtains data by receiving and parsing voice signals, and receives related user information sent by a terminal by contactless transfer, so as to reduce manual input and improve efficiency of information transfer.

DETAILED DESCRIPTION OF THE DRAWINGS OF THE INVENTION

For clarifying embodiments of the invention or solutions of prior art, drawings in the embodiments or drawings in prior art will be described simply. Obviously, the below drawings are just some embodiments of the invention, and other drawings can be obtained by those skilled in the art without involving in an inventive effort.

DETAILED DESCRIPTION OF EMBODIMENTS OF THE INVENTION

The technical solutions of the embodiments of the invention are described in a clear and complete manner in conjunction with the accompanying drawings as below. Obviously, the described embodiments are only part of the embodiments of the invention, not the whole. Based on the embodiments of the invention, other embodiments obtained by those skilled in the art without involving an inventive step should fall below the scope of protection of the disclosure.

Embodiment 1

Figure 1:
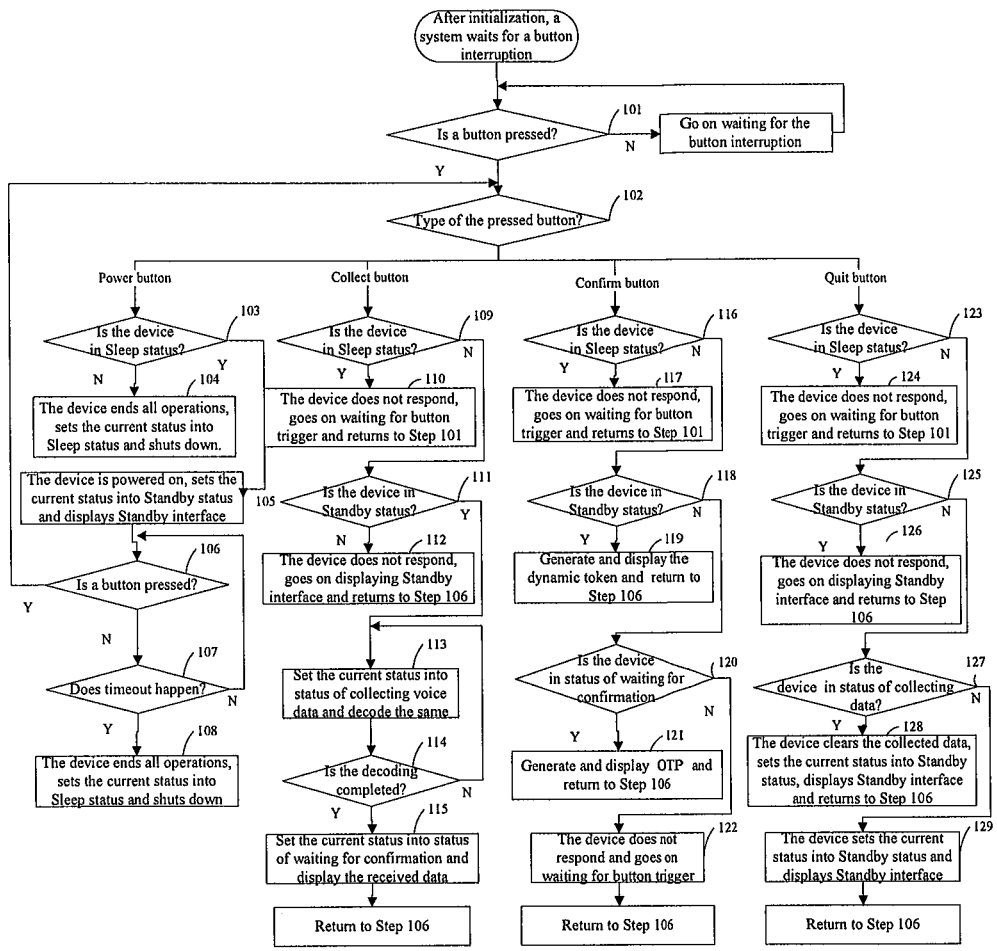
FIG. 1 is a flow chart of a working method of a voice transfer based dynamic token according to Embodiment 1 of the invention.

As illustrated in FIG. 1, for reducing manual input and increasing information transfer efficiency, a working method of a voice transfer based dynamic token is provided in the embodiment 1, which includes that after the device system is initialized, the device system waits for a button trigger, and executes the following steps.

Step 101, determining whether a button is pressed, if yes, going to Step 102; if no, going on waiting for a button trigger and going to Step 101;

Step 102, determining type of the pressed button, if the pressed button is a Power button, going to Step 103; if the pressed button is a Collect button, going to Step 109; if the pressed button is a Confirm button, going to Step 116; if the pressed button is a Quit button, going to Step 123.

Step 103, determining whether the device is in Sleep status, if yes, going to Step 105; if no, going to Step 104.

Step 104, the device ending all operations, setting current status of the device into Sleep status and shutting down.

Step 105, the device is powered on, setting current status of the device into Standby status, displaying a Standby interface and waiting for a button trigger.

Step 106, determining whether the button is pressed, if yes, going to Step 102; if no, going to Step 107.

Step 107, determining whether timeout happens, if yes, going to Step 108; if no, going on waiting for button trigger and returning to Step 106.

Step 108, the device ending all operations, setting the current status into Sleep status and shutting down.

Step 109, determining whether the device is in Sleep status, if yes, going to Step 110; if no, going to Step 111.

Step 110, the device doing not respond, going on waiting for button trigger and returning to Step 101.

Step 111, determining whether the device is in Standby status, if yes, going to Step 113; if no, going to Step 112.

Step 112, the device doing not respond, going on displaying a Standby interface and returning to Step 106.

Step 113, the device setting the current status into status of collecting data, collecting and decoding voice data.

Step 114, determining whether decoding is completed, if yes, going to Step 115; if no, returning to Step 113.

Step 115, the device setting the current status into status of waiting for confirmation, displaying the received data and returning to Step 106.

Step 116, determining whether the device is in Sleep status, if yes, going to Step 117; if no, going to Step 118.

Step 117, the device doing not respond, going on waiting for button trigger and returning to Step 101.

Step 118, determining whether the device is in Standby status, if yes, going to Step 119; if no, going to Step 120.

Step 119, the device generating a OTP, displaying the OTP and returning to Step 106.

Specifically, the generating a OTP includes generating the OTP with SM3 cryptographic algorithm according to a time factor (or an event factor) and a stored seed inside the device.

Step 120, determining whether the device is in status of waiting for confirmation, if yes, going to Step 121; if no, going to Step 122.

Execution order of Step 118 and Step 120 can be reversed.

Step 121, the device generating a OTP, displaying the OTP and going to Step 106.

Specifically, generating a OTP includes generating the OTP with SM3 cryptographic algorithm according to a time factor (or an event factor) and a stored seed inside the device.

Step 122, the device doing not respond, going on waiting for button trigger and returning to Step 106.

Step 123, determining whether the device is in Sleep status, if yes, going to Step 124; if no, going to Step 125.

Step 124, the device doing not respond, going on waiting for button trigger and returning to Step 101.

Step 125, determining whether the device is in Standby status, if yes, going to Step 126; if no, going to Step 127.

Step 126, the device doing not respond, going on displaying a Standby interface and returning to Step 106.

Step 127, determining whether the device is in status of collecting data, if yes, going to Step 128; if no, going to Step 129.

Step 128, the device clearing the collected data, setting the current status into Standby status, displaying a Standby interface and returning to Step 106.

Step 129, the device setting the current status into Standby status, displaying Standby interface and returning to Step 106.

Embodiment 2

Figure 2:
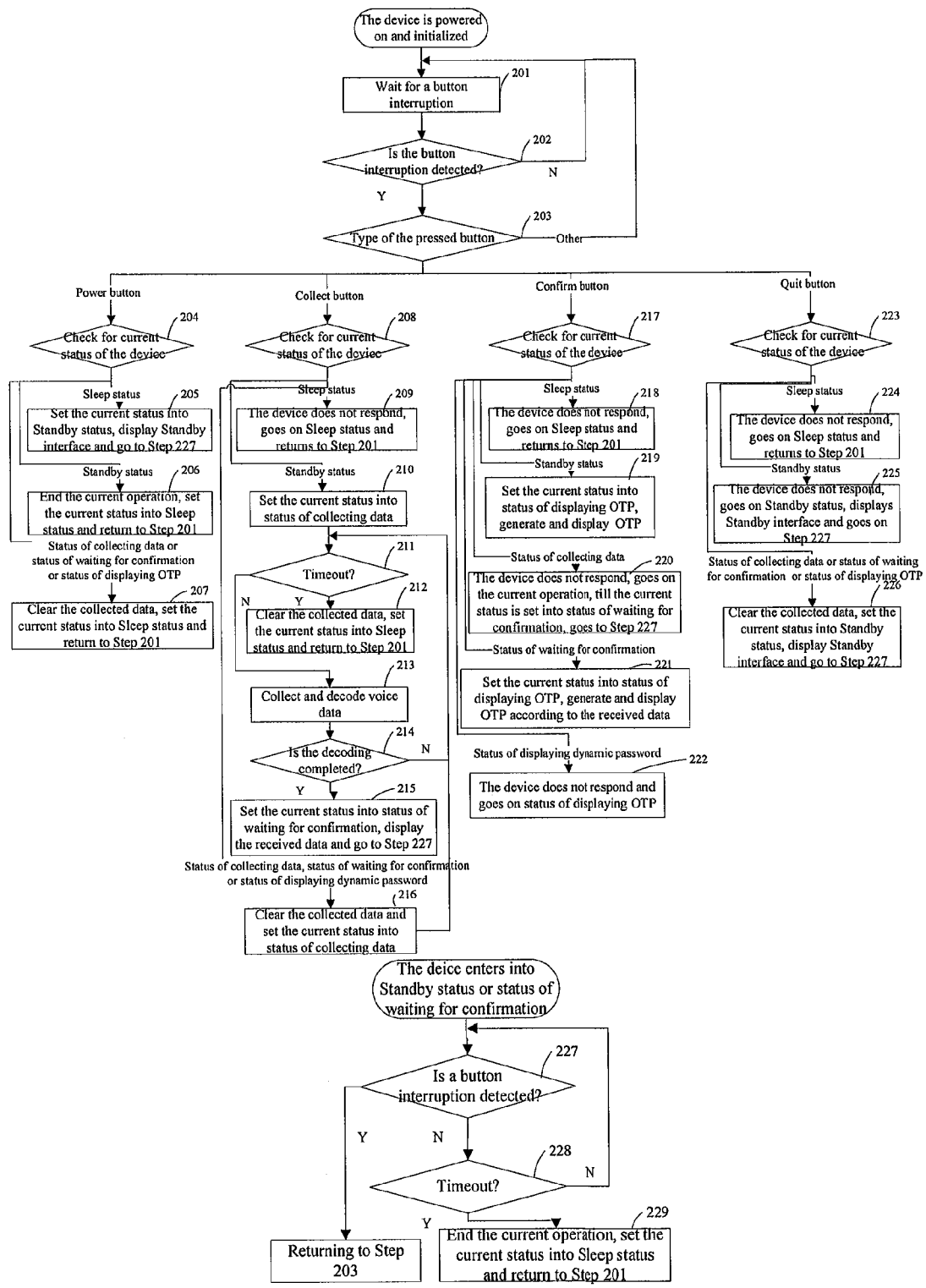
FIG. 2 is a flow chart of a working method of a voice transfer based dynamic token according to Embodiment 2 of the invention.

As illustrated in FIG. 2, for reducing manual input and increasing information transfer efficiency, a working method of a voice transfer based dynamic token is provided in the embodiment 2. The method includes that a device is powered on and initialized, and upon initialization, executes the following steps.

Step 201, waiting for a button interruption.

Step 202, determining whether the button interruption is detected, if yes, going to Step 203; if no, returning to Step 201.

Specifically, Step 201 and Step 202 can be replaced with Step 201' and Step 202'.

Step 201', polling a status value of the button.

Step 202', determining whether change in status value of the button is detected, if yes, going to Step 203; if no, returning to Step 201.

In the embodiment 2, status value of the button is 1 in case that any button is not pressed while status value of the button is 0 in case that any button is pressed.

Step 203, determining type of the pressed button, if the pressed button is a Power button, going to Step 204; if the pressed button is a Collect button, going to Step 208; if the pressed button is a Confirm button, going to Step 217; if the pressed button is a Quit button, going to Step 223; if the pressed button is any other button, going to Step 201.

Other wrong operations include pressing more buttons at one time.

Step 204, checking for the current status of the device, if the device is in Sleep status, going to Step 205; if the device is in Standby status, going to Step 206; if the device is in status of collecting data, or status of waiting for confirmation or status of displaying the OTP, going to Step 207.

Step 205, the device being awakened, setting the current status into Standby status, displaying a Standby interface and going to Step 227.

Step 206, ending the current operation, setting the current status into Sleep status and returning to Step 201.

Step 207, clearing the collected data, ending the current operation, setting the current status into Sleep status and returning to Step 201.

If data is not collected, ending the current operation, setting the current status into Sleep status and returning to Step 201.

Step 208, checking for current status of the device, if the device is in Sleep status, going to Step 209; if the device is in Standby status, going to Step 210; if the device is in status of collecting data or status of waiting for confirmation or status of displaying the OTP, going to Step 216.

Step 209, the device doing not respond, going on Sleep status and returning to Step 201.

Step 210, the device setting current status into status of collecting status and going to Step 211.

Step 211, determining whether timeout happens, if yes, going to Step 212; if no, going to Step 213.

Step 212, clearing the collected data, ending the operation, setting the current status into Sleep status and returning to Step 201.

Step 213, collecting and decoding voice data and going to Step 214.

Step 214, determining whether the decoding is completed, if yes, going to Step 215; if no, returning to Step 211.

Step 215, setting the current status into Confirm status, displaying the received data and going to Step 227.

If the device is in status of collecting data and the current status is not set into status of waiting for confirmation, detecting a button interruption or change in status value of the button, returning to Step 203.

Step 216, clearing the collected data, setting the current status into status of collecting data and returning to Step 211.

If data is not collected, the current status is set into status of collecting data directly and Step 211 is executed.

Step 216 can be replaced with Step 216'. Step 216' includes the device doing not respond, going on the current status and returning to Step 201.

Step 217, checking for current status of the device, if the device is in Sleep status, going to Step 218; if the device is in Standby status, going to Step 219; if the device is in status of collecting data, going to Step 220; if the device is in status of waiting for confirmation, going to Step 221; if the device is in status of displaying OTP, going to Step 222.

Step 218, the device doing not respond, going on in Sleep status and returning to Step 201.

Step 219, setting the current status into status of displaying OTP, generating a OTP and displaying the generated OTP.

Preferably, the generating OTP includes generating the OTP with SM3 cryptographic algorithm according to a time factor (or an event factor) and a stored seed inside the device.

Specifically, after the device completes the step 219, if a button interruption is not detected before the current OTP is expired or within a preset time period, setting the current status into Standby interface and displaying the Standby interface; or setting the current status into Sleep status;

if a button interruption is detected before the current OTP is expired or within a preset time period, returning to Step 203.

Step 220, the device doing not respond, going on the current operation till the current status is set into status of waiting for confirmation and going on Step 227.

If the device detects a button interruption before setting the current status into status of waiting for confirmation, the device returns to Step 203.

Step 221, setting the current status into status of displaying a OTP, generating a OTP according to the received data and displaying the generated OTP.

Preferably, the generating a OTP includes generating the OTP with SM3 cryptographic algorithm according to a time factor (or an event factor) and a stored seed inside the device.

Specifically, after the device completes the step, if a button interruption is not detected before the current OTP is expired or within a preset time period, setting the current status into Standby interface and displaying the Standby interface; or setting the current status into Sleep status;

if the button interruption is detected or a change in status value of the button is detected before the current OTP is expired or within a preset time period, returning to Step 203.

Step 222, the device doing not respond, going on status of displaying OTP, and displaying the OTP.

Specifically, if the button interruption is not detected before the currently displayed OTP is expired or within a preset time period, setting the current status into Standby interface and displaying the Standby interface; or setting the current status into Sleep status;

if the button interruption is detected or a change in status value of the button is detected before the current OTP is expired or within a preset time period, returning to Step 203.

Step 223, checking for current status of the device, if the current status is Sleep status, going to Step 224; if the current status is Standby status, going to Step 225; if the current status is status of collecting data or status of waiting for confirmation or status of displaying the OTP, going to Step 226.

Step 224, the device doing not respond, going on Sleep status and returning to Step 201.

Step 225, the device doing not respond, going on Standby status, displaying Standby status and going to Step 227.

Step 226, clearing the collected data, setting the current status into Standby status, displaying Standby interface and going to Step 227.

Step 227, waiting for button interruption, determining whether the button interruption is detected, if yes, going to Step 203; if no, going to Step 228.

Step 228, determining whether timeout happens, if yes, going to Step 229; if no, returning to Step 227.

Step 229, ending the current operation, setting the current status into Sleep status and returning to Step 201.

Embodiment 3

Figure 3:
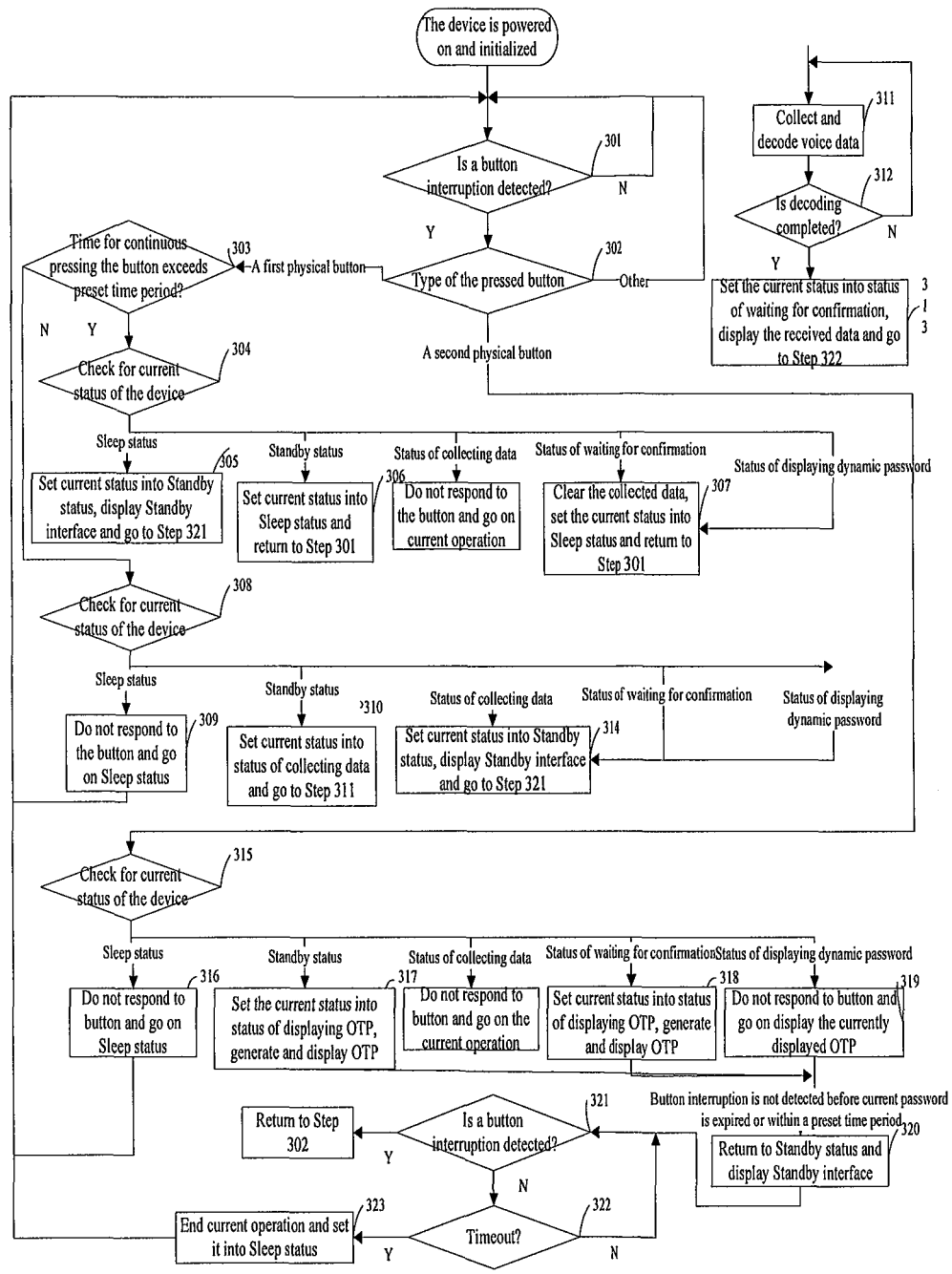
FIG. 3 is a flow chart of a working method of a voice transfer based dynamic token according to Embodiment 3 of the invention.

As illustrated in FIG. 3, for reducing manual input and increasing information transfer efficiency, a working method of a voice transfer based dynamic token is provided in the embodiment 3. The method includes that a device is powered on and initialized, and upon initialization, the method executes the following steps.

Step 301, waiting for a button interruption and determining whether the button interruption is detected, if yes, going to Step 302; if no, going to Step 301 again.

Step 302, determining type of the pressed button, if the pressed button is a first physical button, going to Step 303; if the pressed button is a second physical button, going to Step 316; if the pressed button is other button, going to Step 301.

In the embodiment 3, Step 301 and Step 302 can be replaced with Step 301' and Step 302', which specifically include steps as below.

Step 301', polling status value of the button.

Step 302', determining whether change in status value of the button is detected, if yes, going to Step 303; if no, returning to Step 301.

Specifically, status value of the button is 1 in case that any button is not pressed, while status value of the button is 0 in case that any button is pressed.

Step 303, determining whether time period for continuous pressing the button exceeds a preset time period, if yes, going to Step 304; if no, going to Step 308.

Step 304, checking current status of the device, if the current status is Sleep status, going to Step 305; if the current status is Standby status, going to Step 306; if the current status is status of collecting data and status of waiting for confirmation or status of displaying the OTP, going to Step 307.

Step 305, setting the current status into Standby status, displaying Standby interface and going to Step 322.

Step 306, setting the current status into Sleep status and returning to Step 301.

Step 307, clearing the collected data, setting the current status into Sleep status and returning to Step 301.

Step 308, checking for current status of the device, if the current status is Sleep status, going to Step 309; if the current status is Standby status, going to Step 310; if the current status is status of collecting data or status of waiting for confirmation or status of displaying the OTP, going to Step 314.

Step 309, the device doing not respond to the button, going on Sleep status and returning to Step 301.

Step 310, setting the current status into status of collecting data.

Step 311, collecting and decoding voice data.

Step 312, determining whether the decoding is completed, if yes, going to Step 313; if no, returning to Step 311.

Step 313, setting the current status into status of waiting for confirmation, displaying the received data and going to Step 321.

Step 314, setting the current status into Standby status, displaying Standby interface and going to Step 321.

Step 315, checking for current status of the device, if the current status is Sleep status, going to Step 316; if the current status is Standby status, going to Step 317; if the current status is status of collecting data, the device doing not respond to the button and going on executing the current operation; if the current status is status of waiting for confirmation, going to Step 318; if the current status is status of displaying the OTP, going to Step 319.

Step 316, the device doing not respond to the button, going on Sleep status and returning to Step 301.

Step 317, setting the current status into status of displaying the OTP, generating and displaying the OTP.

Preferably, the generating the OTP includes generating the OTP with SM3 cryptographic algorithm according to a time factor (or an event factor) and a stored seed inside the device.

Step 318, setting the current status into status of displaying the OTP, generating and displaying the OTP.

Preferably, the generating the OTP includes generating the OTP with SM3 cryptographic algorithm according to a time factor (or an event factor) and a stored seed inside the device.

Preferably, the device generates the OTP with SM3 algorithm according to a OTP seed, a current time factor, the collected data and times of collecting data inside the device in the Step 318.

Step 319, the device doing not respond to the button and going on displaying the currently displayed OTP.

Preferably, when the device displays the OTP, if a button interruption is not detected or change in status value of the button is not detected before the currently displayed OTP is expired or within a preset time period, going to Step 320; if the button interruption is detected or change in status value of the button is detected before the currently displayed OTP is expired or within a preset time period, going to Step 302.

Step 320, returning to Standby status and displaying Standby interface and going to Step 321.

Step 321, waiting for a button interruption and determining whether the button interruption is detected, if yes, going to Step 302; if no, going to Step 322.

Step 322, determining whether timeout happens, if yes, going to Step 323; if no, going to Step 321.

Step 323, ending the currently running operation, setting the current status into Sleep status and returning to Step 301.

Embodiment 4

Figure 4:
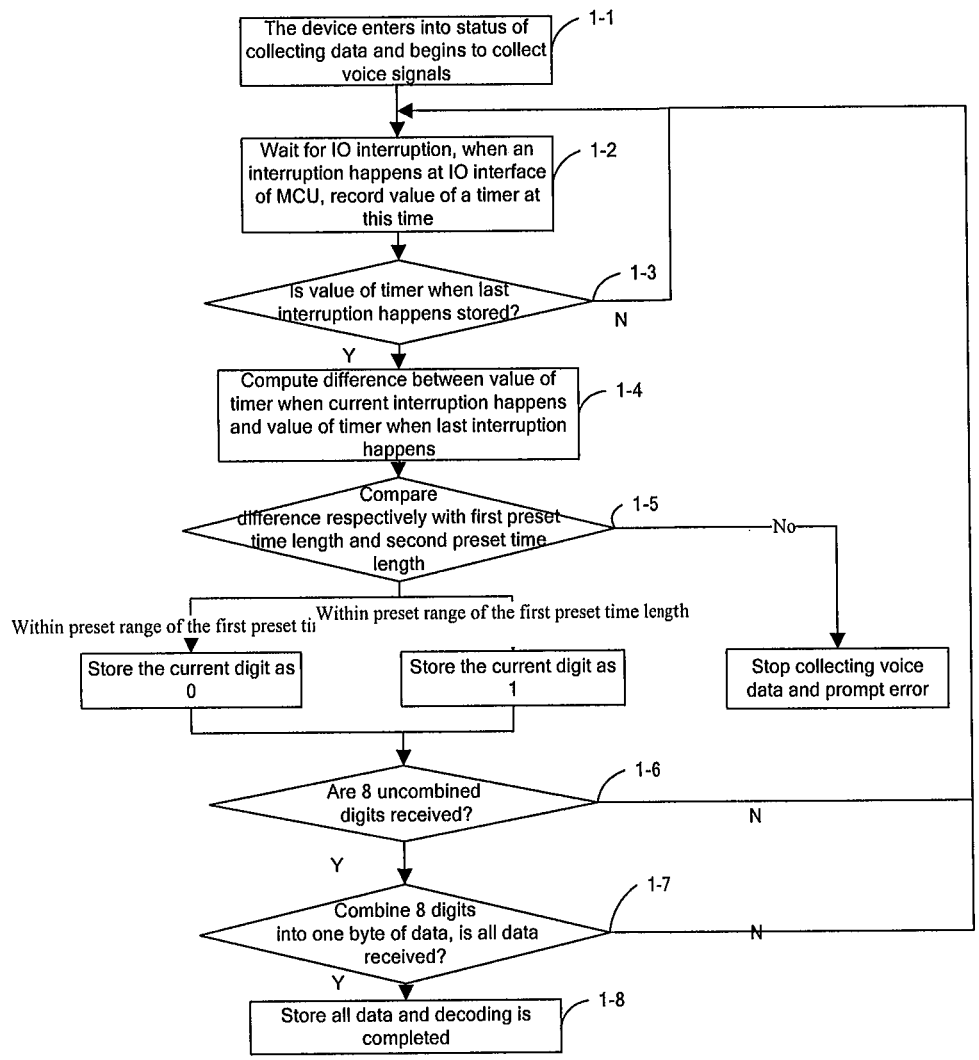
FIG. 4 is a detailed flow chart of collecting and decoding voice data and determining whether the decoding is completed, according to Embodiment 4 of the invention.

A detailed process that the device in Embodiments 1 to 3 collects and decodes voice data and determines whether the decoding is completed is provided in the embodiment 4. As illustrated in FIG. 4, the process includes steps as below.

Step 1-1, the device setting current status into status of collecting data and beginning to collect voice signals.

Step 1-2, waiting for IO interruption, and if an interruption happens at JO interface of the device, recording a value of a timer when the current interruption happens.

Step 1-3, determining whether the value of the timer when a previous interruption happens is stored in the device, if yes, going to Step 1-4; if no, returning to Step 1-2.

Step 1-4, computing difference between value of the timer when the current interruption happens and value of the timer when a previous interruption happens.

Step 1-5, comparing the difference respectively with first preset time length and second preset time length, if the difference is within preset range of the first preset time length, storing a current digit as 0; if the difference is within preset range of the second preset time length, storing the current digit as 1; if the difference is within neither preset range of the first preset time length nor preset range of the second preset time length, stopping collecting voice data and prompting error.

Step 1-6, determining whether the device has received 8 uncombined digits, if yes, going to Step 1-7; if no, returning to Step 1-2.

Step 1-7, combining the 8 digits into one byte of data and determining whether all data has been received, if yes, going to Step 1-8; if no, returning to Step 1-2.

Step 1-8, storing all data and completing the decoding.

Embodiment 5

Figure 5:
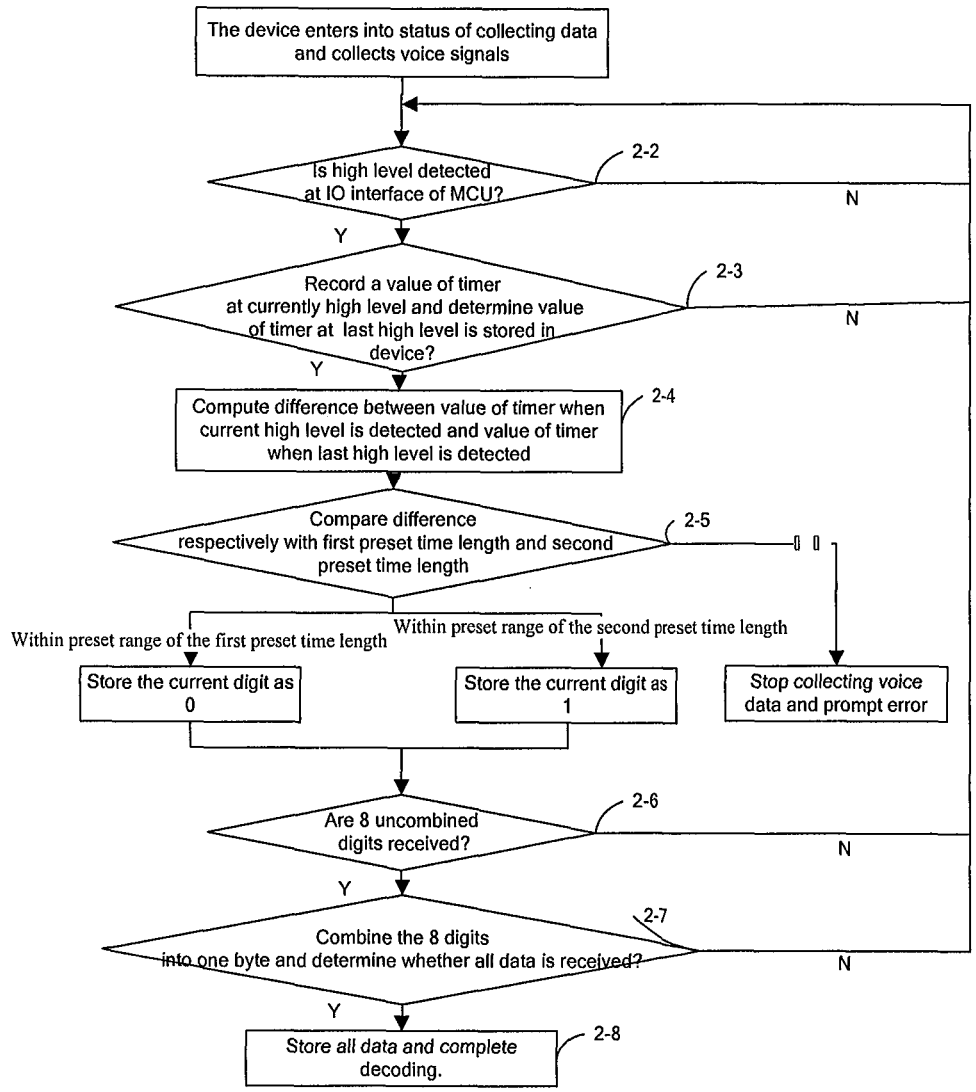
FIG. 5 is a detailed flow chart of collecting and decoding voice data and determining whether the decoding is completed, according to Embodiment 5 of the invention.

A detailed process that the device in Embodiment 1 to Embodiment 3 collects and decodes voice data and determines whether the decoding is completed is provided in the embodiment 5. As illustrated in FIG. 5, the process includes steps as below.

Step 2-1, the device setting current status into status of collecting data and collecting voice signals.

Step 2-2, determining whether high level is detected at JO interface of the device, if yes, going to Step 2-3; if no, going to Step 2-2.

Step 2-3, recording a value of a timer when currently high level is detected and determining whether value of the timer when a previously high level is detected is stored in the device, if yes, going to Step 2-4; if no, returning Step 2-2.

Step 2-4, computing difference between value of the timer when the currently high level is detected and value of the timer when the previously high level is detected.

Step 2-5, comparing the difference with first preset time length and second preset time length, if the difference is within a preset range of the first preset time length, storing the current digit as 0; if the difference is within a preset range of the second preset time length, storing the current digit as 1; if the difference is within neither preset range of the first preset time length nor preset range of the second preset time length, prompting error.

Step 2-6, determining whether the device has received 8 uncombined digits, if yes, going to Step 2-7; if no, going to Step 2-2.

Step 2-7, combining the 8 digits into one byte of data and determining whether all data has been received, if yes, going to Step 2-8; if no, going to Step 2-2.

Step 2-8, storing all data and completing decoding.

Embodiment 6

Figure 6:
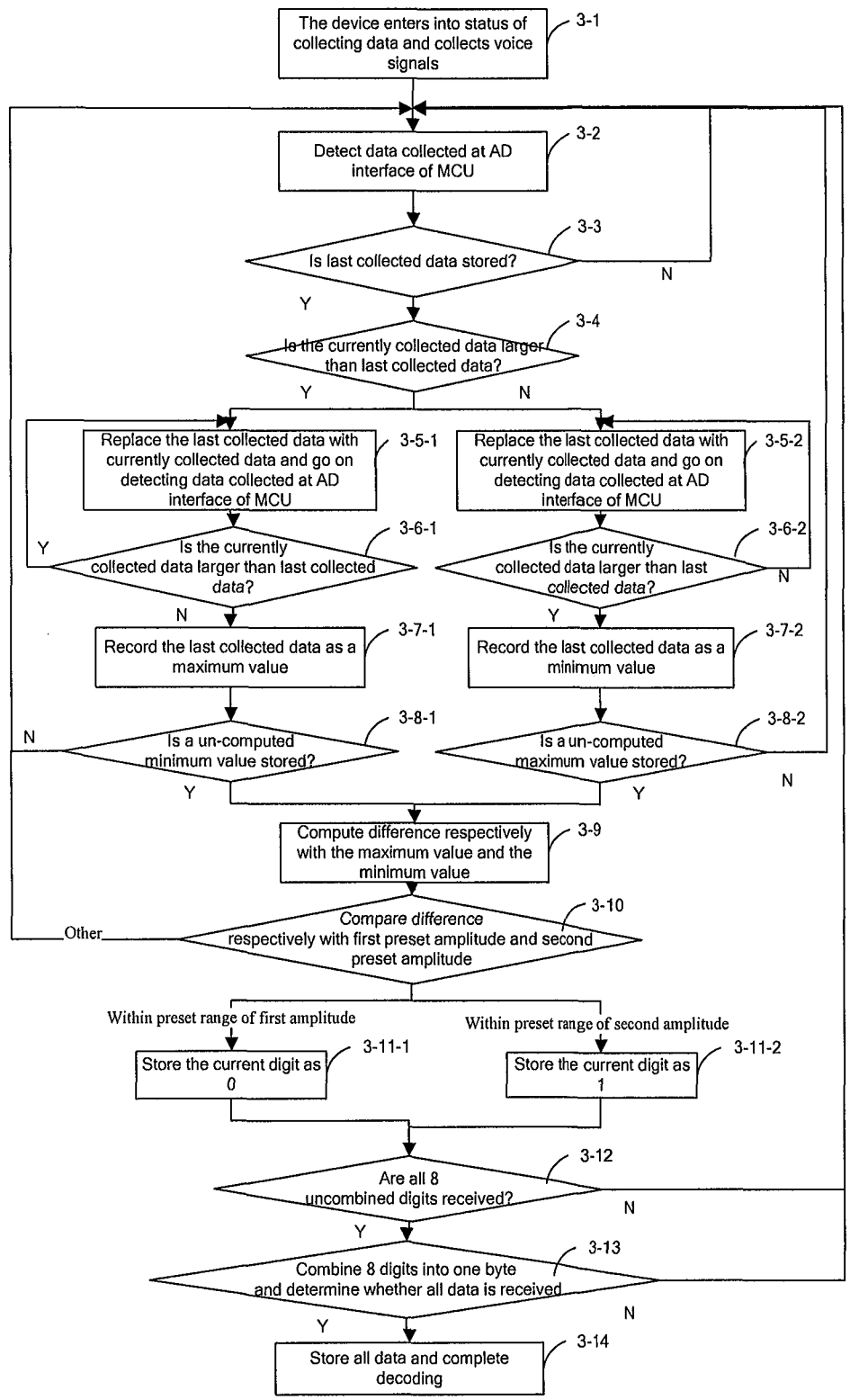
FIG. 6 is a detailed flow chart of collecting and decoding voice data and determining whether the decoding is completed, according to Embodiment 6 of the invention.

A detailed process that the device in Embodiment 1 to Embodiment 3 collects and decodes voice data and determines whether the decoding is completed is provided in the embodiment 6. As illustrated in FIG. 6, the process includes steps as below.

Step 3-1, the device setting current status into status of collecting data and collecting voice signals.

Step 3-2, detecting data collected at AD interface of the device.

Step 3-3, determining whether the previously collected data is stored, if yes, going to Step 3-4; if no, returning to Step 3-2.

Step 3-4, determining whether the currently collected data is larger than the previously collected data, if yes, going to Step 3-5-1; if no, going to Step 3-5-2.

Step 3-5-1, replacing the previously collected data with the currently collected data and going on detecting data collected at AD interface.

Step 3-6-1, determining whether the currently collected data is larger than the previously collected data, if yes, returning to Step 3-5-1; if no, going to Step 3-7-1.

Step 3-7-1, recording the previously collected data as a maximum value.

Step 3-8-1, determining whether an un-computed minimum value is stored, if yes, going to Step 3-9; if no, returning to Step 3-2.

Step 3-5-2, replacing the previously collected data with the currently collected data and going on detecting data collected at AD interface.

Step 3-6-2, determining whether the currently collected data is larger than the previously collected data, if yes, going to Step 3-7-2; if no, returning to Step 3-5-2.

Step 3-7-2, recording the previously collected data as a minimum value.

Step 3-8-2, determining whether an un-computed maximum value is stored, if yes, going to Step 3-9; if no, returning to Step 3-5-2.

Step 3-9, computing difference between the maximum value and the minimum value.

Step 3-10, comparing the difference respectively with a first preset amplitude and a second preset amplitude, if the difference is within preset range of the first preset amplitude, going to Step 3-11-1; if the difference is within preset range of the second preset amplitude, going to Step 3-11-2; if the difference is within neither preset range of the first preset amplitude nor preset range of the second preset amplitude, going to Step 3-2.

Step 3-11-1, storing the current digit as 0 and going to Step 3-12.

Step 3-11-2, storing the current digit as 1 and going to Step 3-12.

Step 3-12, determining whether 8 uncombined digits have been received, if yes, going to Step 3-13; if no, going to Step 3-2.

Step 3-13, combining the 8 digits into one byte of data and determining whether all data has been received, if yes, going to Step 3-14; if no, returning to Step 3-2.

Step 3-14, storing all data and completing the decoding.

Embodiment 7

Figure 7:
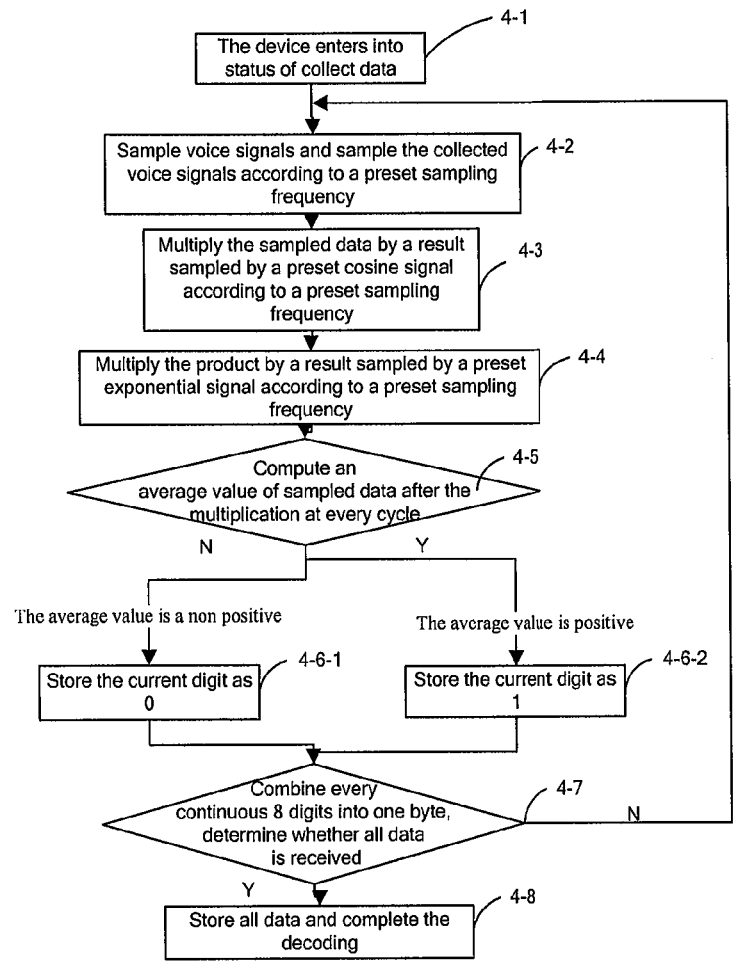
FIG. 7 is a detailed flow chart of collecting and decoding voice data and determining whether the decoding is completed, according to Embodiment 7 of the invention.

A detailed process that the device in Embodiment 1 to Embodiment 3 collects and decodes voice data and determines whether the decoding is completed is provided in the embodiment 7. As illustrated in FIG. 7, the process includes steps as below.

Step 4-1, the device setting a current status into status of collecting data.

Step 4-2, collecting voice signals and sampling the collected voice signals according to a preset sampling frequency.

Figure 8:
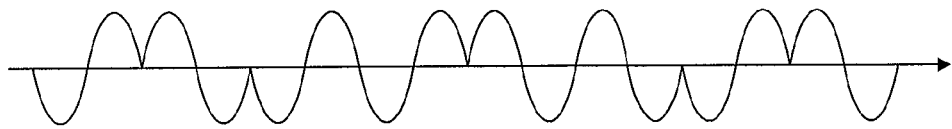
FIG. 8 is a diagram of 2PSK signal according to Embodiment 7 of the invention.

Preferably, the voice signal is 2PSK signal as illustrated in FIG. 8; the preset sampling frequency is 6 dots every cycle; and the sampled data is as below.

```
{
    0, -0.5, -0.5, 0, 0.5, 0.5; 0, 0.5, 0.5, 0, -0.5, -0.5;
    0, -0.5, -0.5, 0, 0.5, 0.5; 0, 0.5, 0.5, 0, -0.5, -0.5;
    0, -0.5, -0.5, 0, 0.5, 0.5; 0, 0.5, 0.5, 0, -0.5, -0.5;
    0, -0.5, -0.5, 0, 0.5, 0.5; 0, 0.5, 0.5, 0, -0.5, -0.5;
}.
```

Step 4-3, multiplying the sampled data by a result sampled by a preset cosine signal according to the preset sampling frequency.

Preferably, the preset cosine signal is $\cos(\omega_c t)$; the preset sampling frequency is 6 dots every cycle; and the result sampled by the cosine signal according to the preset sampling frequency is $\{0, 0.5, 0.5, 0, -0.5, -0.5\}$. The data obtained by multiplying the sampled data by a result sampled by the preset cosine signal according to the preset sampling frequency is as below.

```
{
    0, -0.25, -0.25, 0, -0.25, -0.25;
    0, 0.25, 0.25, 0, 0.25, 0.25;
    0, -0.25, -0.25, 0, -0.25, -0.25;
    0, -0.25, -0.25, 0, -0.25, -0.25;
    0, 0.25, 0.25, 0, 0.25, 0.25;
    0, 0.25, 0.25, 0, 0.25, 0.25;
    0, -0.25, -0.25, 0, -0.25, -0.25;
    0, 0.25, 0.25, 0, 0.25, 0.25;
}.
```

Step 4-4, multiplying product of Step 4-3 by the result sampled by a preset exponential signal according to the preset sampling frequency.

Specifically, the preset exponential signal is $1/(RC) \exp(-t/RC)$; the preset sampling frequency is 6 dots every cycle. The data obtained by multiplying the product of Step 4-3 by a result sampled by the preset exponential signal according to the preset sampling frequency is as below.

```
{
    0, -0.25, -0.25, 0, -0.25, -0.25;
    0, 0.25, 0.25, 0, 0.25, 0.25;
    0, -0.25, -0.25, 0, -0.25, -0.25;
    0, -0.25, -0.25, 0, -0.25, -0.25;
    0, 0.25, 0.25, 0, 0.25, 0.25;
    0, 0.25, 0.25, 0, 0.25, 0.25;
    0, -0.25, -0.25, 0, -0.25, -0.25;
    0, 0.25, 0.25, 0, 0.25, 0.25;
}
```

Step 4-5, computing arithmetic average value of all values obtained from all sampling dots at each cycle after the above multiplication, if the arithmetic average value is positive, going to Step 4-6-2; if the arithmetic average value is non-positive, going to Step 4-6-1.

Specifically, in the embodiment 7, the arithmetic average value of values obtained from all sampling dots at each cycle after the above multiplication is as below.

$-1/6, 1/6, -1/6, -1/6, 1/6, 1/6, -1/6, 1/6$.

Step 4-6-1, storing the current digit as 0 and going to Step 4-7.

Step 4-6-2, storing the current digit as 1 and going to Step 4-7.

Specifically, data corresponding to the voice signal collected by the device is 10110010.

Step 4-7, combining continuous 8 digits into one byte of data and determining whether all data has been received, if yes, going to Step 4-8; if no, returning to Step 4-2.

Step 4-8, storing all data and completing the decoding.

The above-mentioned embodiments are just preferred embodiments of the invention, and any modifications and substitutions by those skilled in the art within the range of solution of the invention should fall below the scope of protection of the invention.

The invention claimed is:

1. A working method of a voice transfer based dynamic token, comprising:
   Step a), waiting for receiving a button interruption and determining whether the button interruption is received, if yes, determining type of the pressed button, if the pressed button is a Power button, going to Step b); if the pressed button is a Collect button, going to Step c); if the pressed button is a Confirm button, going to Step d);
   Step b), checking for current status of the dynamic token, if the current status is Sleep status, setting the current status into Standby status, displaying a Standby interface and going to Step f); if the current status is Standby status or status of collecting data or status of waiting for confirmation, setting the current status into Sleep status and going to Step a);
   Step c), checking for current status of the dynamic token, if the current status is Standby status, setting the current status into status of collecting data, collecting and decoding voice data, and after the decoding is completed, setting the current status into status of waiting for confirmation, displaying the received data and going to Step f);
   Step d), checking for current status of the dynamic token, if the current status is Sleep status, going to Step a); if the current status is status of collecting data, returning to Step a); if the current status is status of waiting for confirmation, setting the current status into status of displaying an one-time password (OTP), generating and displaying a OTP according to the received data; if the current status is status of displaying the OTP, returning to Step a);
   Step f), waiting for a button interruption and determining whether the button interruption is detected, if the button interruption is detected, determining type of the pressed button, if the pressed button is a Power button, returning to Step b); if the pressed button is Collect button, returning to Step c); if the pressed button is Confirm button, returning to Step d); if the button interruption is not detected, going to Step g); and Step g), determining whether timeout happens, if yes, setting the current status into Sleep status and returning to Step a); if no, returning to Step f).

2. The method of claim 1, wherein Step a) can be replaced with polling status value of the button and determining whether change in status value of the button is detected, if yes, determining type of the pressed button, if the pressed button is the Power button, going to Step b); if the pressed button is the Collect button, going to Step c); if the pressed button is the Confirm button, going to Step d); if change in status value of the button is not detected, going to Step a); and correspondingly, Step f) can be replaced with polling status value of the button and determining whether change in status value of the button is detected, if change in status value of the button is detected, determining type of the pressed button, if the pressed button is the Power button, going to Step b); if the pressed button is the Collect button, going to Step c); if the pressed button is the Confirm button, going to Step d); if change in status value of the button is not detected, going to Step g).

3. The method of claim 2, wherein, in Step d), checking for current status of the dynamic token further comprises that, if the current status is Standby status, setting the current status into status of displaying a OTP, generating the OTP by computing a dynamic factor and a seed with SM3 cryptographic algorithm and displaying the OTP, in which the dynamic factor is a time factor or an event factor.

4. The method of claim 2, wherein, after generating and displaying a OTP, the method further comprises:
if change in status value of the button is not detected before the current OTP is expired or within a preset time period, setting the current status into Standby status, displaying a Standby interface and going to Step f); and
if change in status value of the button is detected before the current OTP is expired or within a preset time period, determining type of the pressed button, if the pressed button is a Power button, going to Step b); if the pressed button is a Collect button, going to Step c); and if the pressed button is a Confirm button, going to Step d).

5. The method of claim 2, wherein, when determining type of the pressed button, the method further comprises: if the pressed button is a Quit button, going to Step e); and Step e) further comprises checking for current status of the dynamic token, if the current status is Sleep status, returning to Step a); if the current status is Standby status, going to Step f); and if the current status is status of collecting data or status of waiting for confirmation or status of displaying a OTP, setting the current status into Standby status, displaying a Standby interface and going to Step f).

6. The method of claim 2, wherein, in Step c), checking for current status of the dynamic token further comprises:
if the current status is Sleep status, returning to Step a); or
if the current status is Sleep status, setting the current status into status of collecting data, collecting and decoding data, and after the decoding is completed, setting the current status into status of waiting for confirmation, displaying the received data and going to Step f).

7. The method of claim 2, wherein in Step c), checking for current status of the dynamic token further comprises:
if the current status is status of collecting data or status of waiting for confirmation or status of displaying a password, going to Step a); or if the current status is status of collecting data or status of waiting for confirmation or status of displaying a password, collecting and decoding data, and after the decoding is completed, setting the current status into status of waiting for confirmation, displaying the received data and going to Step f).

8. The method of claim 7, wherein setting the current status into status of collecting data, collecting and decoding voice data, and after the decoding is completed, setting the current status into status of waiting for confirmation, displaying the received data and going to Step f) comprises:
Step 1), entering into status of collecting data and determining whether timeout happens, if yes, setting the current status into Sleep status, returning to Step a); if no, going to Step 2);
Step 2), collecting and decoding voice data and going to Step 3);
Step 3), determining whether decoding is completed, if yes, setting the current status into status of waiting for confirmation, displaying the received data and going to Step f); if no, returning to Step 2).

9. The method of claim 8, wherein collecting and decoding voice data comprises:
waiting for IO interruption, in case of detecting an interruption at IO interface, recording a value of timer when the interruption happens, computing difference between values of the timer when two continuous interruptions happen, in which the value having been computed is not used; if the difference is within a preset range of the first preset time length, storing the current digit as 0; if the difference is within a preset range of the second preset time length, storing the current digit as 1 and combining continuous 8 digits into one byte of data.

10. The method of claim 8, wherein said collecting and decoding voice data comprises:
repeatedly detecting level of IO interface, and in case of detecting high level, recording a value of the timer when the high level is detected; computing difference between values of the timer when two continuous high levels are detected, in which any value having been computed is not used, if the difference is within a preset range of a first preset time length, storing the current digit as 0; if the difference is within a preset range of a second preset time length, storing the current digit as 1, and combining continuous 8 digits into one byte of data.

11. The method of claim 8, wherein said collecting and decoding voice data comprises:
repeatedly detecting and recording data collected at AD interface, comparing each recorded data with the previously recorded data, if there is not the previously recorded data, omitting the comparing step; if the currently recorded data is larger than the previously recorded data, going on detecting till the currently recorded data is smaller than the previously recorded data, recording the previously recorded data of the currently recorded data as the maximum value; if the currently recorded data is not larger than the previously recorded data, going on detecting till the currently recorded data is larger than the previously recorded data, storing the previously recorded data of the currently recorded data as the minimum value, computing difference between two contiguous maximum value and minimum value, in which any value having been computed is not used; if the difference is within a preset range of a first preset amplitude, storing current digit as 0; if the difference is within a preset range of a second preset amplitude, storing current digit as 1, and combining continuous 8 digits into one byte of data.

12. The method of claim 8, wherein said collecting and decoding voice data comprises:
collecting voice signals, sampling the collected voice signals according to a preset sampling frequency, multiplying the sampled data by result data sampled by a preset cosine signal according to a preset sampling frequency, and then multiplying the product by result data sampled by a preset exponential signal according to a preset sampling frequency, computing an arithmetic average value of all sampled data at each cycle after the above multiplication, and if the arithmetic average value is negative, setting the current digit as 1; if the arithmetic average value is non-negative, storing the current digit as 0, and combining continuous 8 digits into one byte of data.

13. The method of claim 2, wherein said generating and displaying a OTP according to the received data comprises: generating the OTP by computing a dynamic factor, a seed and the received data with SM3 cryptographic algorithm and displaying the OTP, in which the dynamic factor is a time factor or an event factor.

14. The method of claim 1, wherein, in Step d), checking for current status of the dynamic token further comprises that, if the current status is Standby status, setting the current status into status of displaying a OTP, generating the OTP by computing a dynamic factor and a seed with SM3 cryptographic algorithm and displaying the OTP, in which the dynamic factor is a time factor or an event factor.

15. The method of claim 1, wherein, after generating and displaying a OTP, the method further comprises:
if the button interruption is not detected before the current OTP is expired or within a preset time period, setting the current status into Standby status, displaying a Standby interface and going to Step f); and
if the button interruption is detected before the current OTP is expired or within a preset time period, determining type of the pressed button, if the pressed button is a Power button, going to Step b); if the pressed button is a Collect button, going to Step c); and if the pressed button is a Confirm button, going to Step d).

16. The method of claim 1, wherein, when determining type of the pressed button, the method further comprises: if the pressed button is a Quit button, going to Step e); and Step e) further comprises checking for current status of the dynamic token, if the current status is Sleep status, returning to Step a); if the current status is Standby status, going to Step f); and if the current status is status of collecting data or status of waiting for confirmation or status of displaying a OTP, setting the current status into Standby status, displaying a Standby interface and going to Step f).

17. The method of claim 1, wherein, in Step c), checking for current status of the dynamic token further comprises:
if the current status is Sleep status, returning to Step a); or
if the current status is Sleep status, setting the current status into status of collecting data, collecting and decoding data, and after the decoding is completed, setting the current status into status of waiting for confirmation, displaying the received data and going to Step f).

18. The method of claim 1, wherein, in Step c), checking for current status of the dynamic token further comprises:
if the current status is status of collecting data or status of waiting for confirmation or status of displaying a password, going to Step a); or if the current status is status of collecting data or status of waiting for confirmation or status of displaying a password, collecting and decoding data, and after the decoding is completed, setting the current status into status of waiting for confirmation, displaying the received data and going to Step f).

19. The method of claim 18, wherein setting the current status into status of collecting data, collecting and decoding voice data, and after the decoding is completed, setting the current status into status of waiting for confirmation, displaying the received data and going to Step f) comprises:
Step 1), entering into status of collecting data and determining whether timeout happens, if yes, setting the current status into Sleep status, returning to Step a); if no, going to Step 2);
Step 2), collecting and decoding voice data and going to Step 3);
Step 3, determining whether the decoding is completed, if yes, setting the current status into status of waiting for confirmation, displaying the received data and going to Step f); if no, returning to Step 2).

20. The method of claim 19, wherein collecting and decoding voice data comprises:
waiting for IO interruption, and in case of detecting an interruption at IO interface, recording a value of timer when the current interruption happens, computing difference between values of the timer when two continuous interruptions happen, in which the value having been computed is not used; if the difference is within a preset range of the first preset time length, storing the current digit as 0; if the difference is within a preset range of the second preset time length, storing the current digit as 1, and combining continuous 8 digits into one byte of data.

21. The method of claim 19, wherein said collecting and decoding voice data comprises:
repeatedly detecting level of IO interface, and in case of detecting high level, recording a value of the timer when the high level is detected; computing difference between values of the timer when two continuous high levels are detected, in which any value having been computed is not used, if the difference is within a preset range of a first preset time length, storing the current digit as 0; if the difference is within a preset range of a second preset time length, storing the current digit as 1, and combining continuous 8 digits into one byte of data.

22. The method of claim 19, wherein said collecting and decoding voice data comprises:
repeatedly detecting and recording data collected at AD interface, comparing each recorded data with the previously recorded data, if there is not the previously recorded data, omitting the comparing step; if the currently recorded data is larger than the previously recorded data, going on detecting till the currently recorded data is smaller than the previously recorded data, recording the previously recorded data previous to the currently recorded data as the maximum value; if the currently recorded data is not larger than the previously recorded data, going on detecting till the currently recorded data is larger than the previously recorded data, storing the previously recorded data previous to the currently recorded data as the minimum value, computing difference between two preliminary maximum value and minimum value, in which any value having been computed is not used; if the difference is within a preset range of a first preset amplitude, storing current digit as 0; if the difference is within a preset range of a second preset amplitude, storing current digit as 1, and combining continuous 8 digits into one byte of data.

23. The method of claim 19, wherein said collecting and decoding voice data comprises:

collecting voice signals, sampling the collected voice signals according to a preset sampling frequency, multiplying the sampled data by result data sampled by a preset cosine signal according to a preset sampling frequency, and then multiplying the product by result data sampled by a preset exponential signal according to a preset sampling frequency, computing an arithmetic average value of all sampled data at each cycle after the above multiplication, and if the arithmetic average value is negative, setting the current digit as 1; if the arithmetic average value is non-negative, storing the current digit as 0, and combining continuous 8 digits into one byte of data.

24. The method of claim 1, wherein said generating and displaying a OTP according to the received data comprises: generating the OTP by computing a dynamic factor, a seed and the received data with SM3 cryptographic algorithm and displaying the OTP, in which the dynamic factor is a time factor or an event factor.

* * * * *